United States Patent [19]

Müller et al.

[11] Patent Number: 4,639,502

[45] Date of Patent: Jan. 27, 1987

[54] SUBSTANTIALLY COLORLESS ORGANIC POLYISOCYANATES, PROCESSES FOR THEIR PRODUCTION AND THEIR USE IN THE PRODUCTION OF POLYURETHANE PLASTICS

[75] Inventors: Hanns P. Müller, Odenthal; Werner Clarenz, Leverkusen; Ulrich von Gizycki, Leverkusen; Kuno Wagner, Leverkusen, all of Fed. Rep. of Germany

[73] Assignee: Bayer Aktiengesellschaft, Bayerwerk, Fed. Rep. of Germany

[21] Appl. No.: 730,134

[22] Filed: May 3, 1985

[30] Foreign Application Priority Data

May 8, 1984 [DE] Fed. Rep. of Germany ....... 3416896

[51] Int. Cl.$^4$ .................... C08G 18/80; C08G 18/79
[52] U.S. Cl. .................................. 528/45; 528/44; 528/73; 528/59; 252/182
[58] Field of Search ................ 528/45, 44, 73; 252/182

[56] References Cited

U.S. PATENT DOCUMENTS

| | | | |
|---|---|---|---|
| 2,885,420 | 5/1959 | Spiegler | 260/453 |
| 2,885,421 | 5/1959 | Spiegler | 260/453 |
| 2,885,423 | 5/1959 | Spiegler | 260/453 |
| 2,885,424 | 5/1959 | Spiegler | 260/453 |
| 2,885,425 | 5/1959 | Spiegler | 260/453 |
| 3,226,411 | 12/1965 | Smith | 260/453 |
| 3,226,413 | 12/1965 | Smith | 260/453 |
| 3,226,414 | 12/1965 | Smith | 260/453 |
| 3,281,446 | 10/1966 | Manning | 260/453 |
| 3,384,653 | 5/1968 | Erner et al. | 260/453 |

*Primary Examiner*—Herbert S. Cockeram
*Attorney, Agent, or Firm*—Gene Harsh; Joseph C. Gil; Thomas W. Roy

[57] ABSTRACT

The present invention relates to substantially colorless organic polyisocyanates, optionally in solution in an inert solvent, having a Hazen color index according to DIN 53 409 of at most 60 and a yellow value according to DIN 6167 of at most 3.0, characterized by a content of about 0.01 to 1 ppm (by weight), based on polyisocyanate, of an organic dye soluble in the polyisocyanate and having an absorption maximum of about 560 to 590 nm or a mixture of such dyes.

The present invention also relates to two processes for preparing the substantially colorless organic polyisocyanates. In the first process, the organic dye is added to the prepared polyisocyanate while in the second process the organic dye is added to the starting materials used to prepare the polyisocyanate. Finally, the present invention is directed to the production of polyisocyanate polyaddition products from the substantially colorless organic polyisocyanates and isocyanate-reactive compounds.

11 Claims, No Drawings

SUBSTANTIALLY COLORLESS ORGANIC POLYISOCYANATES, PROCESSES FOR THEIR PRODUCTION AND THEIR USE IN THE PRODUCTION OF POLYURETHANE PLASTICS

BACKGROUND OF THE INVENTION

1. Field of the Invention

This invention relates to substantially colorless, organic polyisocyanates containing about 0.01 to 1 ppm (by weight) of an organic dye (mixture) soluble in the polyisocyanate and having an absorption maximum of about 560 to 590 nm, to processes for producing these colorless organic polyisocyanates and to their use in the production of polyisocyanate polyaddition products, preferably polyurethane plastics, by the isocyanate polyaddition process.

2. Description of the Prior Art

Organic polyisocyanates, particularly those containing aliphatically and/or cycloaliphatically bound isocyanate groups, are widely used in practice, particularly in the production of light-stable polyurethane plastics and lacquer coatings characterized by extremely high fastness to light, high chalking resistance and excellent gloss retention. In practice, modification products (of simple aliphatic or cycloaliphatic diisocyanates) having a reduced vapor pressure are generally used in those fields. Modification products of the type in question are, for example, polyisocyanates of reduced vapor pressure containing allophanate, uretdione, urea, semicarbazide, urethane and, in particular, biuret or isocyanurate structural units. In the commercial production of these modification products from the corresponding simple diisocyanates, the inadequate color stability under heat of the reaction mixtures often leads to discolored, generally yellowish to yellow polyisocyanates. This yellowing, particularly in the field of lacquers, frequently prevents uniform coloring, especially in the case of pigmented metallic lacquers.

It has now been found that these disadvantages can be obviated by incorporating in the polyisocyanates very small quantities of the dyes described in detail hereinafter which are soluble therein so that substantially colorless polyisocyanates are obtained from the yellowish to yellow polyisocyanates.

SUMMARY OF THE INVENTION

The present invention relates to substantially colorless organic polyisocyanates, optionally in solution in an inert solvent, having a Hazen color index according to DIN 53 409 of at most 60 and a yellow value according to DIN 6167 of at most 3.0, characterized by a content of about 0.01 to 1 ppm (by weight), based on polyisocyanate, of an organic dye soluble in the polyisocyanate and having an absorption maximum of about 560 to 590 nm or a mixture of such dyes.

The present invention also relates to a first process for producing these substantially colorless organic polyisocyanates wherein the starting polyisocyanates, optionally dissolved in an inert solvent, are mixed with about 0.01 to 1 ppm (by weight), based on polyisocyanate, of an organic dye soluble in the polyisocyanate and having an absorption maximum of about 560 to 590 nm or a mixture of such dyes.

The invention also relates to a second process for producing the substantially colorless organic polyisocyanates wherein lacquer-grade polyisocyanates are produced by the biuretization or trimerization known per se of diisocyanates in the presence of about 0.01 to 1 ppm (by weight), based on the weight of the lacquer-grade polyisocyanate obtained by biuretization or trimerization, of an organic dye soluble in the polyisocyanate and having an absorption maximum of about 560 to 590 nm or of a mixture of such dyes.

Finally, the present invention also relates to the use of these substantially colorless organic polyisocyanates, optionally blocked by blocking agents for isocyanate groups, for the production of polyisocyanate polyaddition products, preferably polyurethane plastics, by the isocyanate polyaddition process wherein the polyisocyanates are reacted with isocyanate-reactive compounds, preferably compounds containing hydroxyl groups.

DETAILED DESCRIPTION OF THE INVENTION

The processes according to the invention are suitable for the production of substantially colorless polyisocyanates, i.e. polyisocyanates having a Hazen color index according to DIN 53 409 of at most 60, preferably at most 50, and a yellow value according to DIN 6167 of at most 3.0, preferably at most 2.6, using starting polyisocyanates which have a Hazen color index of up to 300, preferably up to 250, and a yellow value of up to 15, preferably up to 12.5. In many cases, it is also possible, by completely compensating the discoloration of the starting polyisocyanates, to obtain end products which have a Hazen color index of 0 and a yellow value of 0.

The first process according to the invention is basically suitable for eliminating the discoloration of any organic polyisocyanates having a Hazen color index and a yellow value of the order mentioned above. The process is of particular interest for modified organic diisocyanates which are often not obtainable in completely colorless form. Diisocyanates such as these include the modified polyisocyanates discussed in the foregoing and, in particular, the polyisocyanates containing urethane, biuret or isocyanurate groups which are known as "lacquer-grade polyisocyanates."

The polyisocyanates containing urethane groups which are of particular interest in this regard include in particular the reaction products of (i) 2,4-diisocyanatotoluene or technical mixtures thereof with up to about 35% by weight, based on the mixture as a whole, of 2,6-diisocyanatotoluene with (ii) substoichiometric quantities of low molecular weight polyols having a molecular weight in the range of about 62 to 200 such as ethylene glycol, 1,2-, 1,3- or 1,4-dihydroxybutane, triethylol propane or mixtures thereof. These reaction products are freed from unreacted excess starting diisocyanates by thin-layer distillation after their production. The production of urethane group-containing polyisocyanates such as these is described, for example, in DE-PS No. 1,090,196.

The polyisocyanates containing biuret groups which are of particular interest in the context of the present invention include in particular those based on 1,6-diisocyanatohexane, i.e. N,N',N"-tris-(6-isocyanatohexyl)-biuret and mixtures thereof with higher homologs, of the type obtainable for example in accordance with DE-PS No. 1,101,394, U.S. Pat. No. 3,358,010 or EP-PS No. 3505.

The polyisocyanates containing isocyanurate groups which are of particular interest in the context of the present invention include in particular the isocyanate group-containing trimers or mixed trimers based on 2,4-diisocyanatotoluene or mixtures thereof with up to 35% by weight, based on the mixture as a whole, of 2,6-diisocyanatotoluene, 1,6-diisocyanatohexane or 1-isocyanato-3,3,5-trimethyl-5-isocyanatomethyl cyclohexane, the production of which is described, for example, in DE-PS Nos. 1,201,992, 1,670,667, GB-PS Nos. 1,506,373, 1,458,564, DE-PS No. 2,641,380, U.S. Pat. Nos. 4,324,879, 4,288,586, DE-OS Nos. 3,100,262, 3,100,263, 3,144,672, 3,244,407 or 3,033,860.

In the first process according to the invention, the starting polyisocyanates mentioned are preferably used in monomer-free or low-monomer form, i.e. the starting polyisocyanates are generally modification products of the diisocyanates mentioned by way of example which, as mentioned above in reference to the urethane polyisocyanates, have largely been freed from excess starting diisocyanates, i.e. to a residual content of less than about 1% by weight, preferably less than 0.5% by weight, by thin-layer distillation after their production.

Particularly preferred starting polyisocyanates to be used in the process according to the invention are the biuret polyisocyanates based on 1,6-diisocyanatohexane mentioned by way of example in the foregoing, the isocyanurate polyisocyanates based on 1,6-diisocyanatohexane, the isocyanurate polyisocyanates based on 1-isocyanato-3,3,5-trimethyl-5-isocyanatomethyl cyclohexane and the isocyanurate-group-containing mixed trimers based on mixtures of 1,6-diisocyanatohexane and 1-isocyanato-3,3,5-trimethyl-5-isocyanatomethyl cyclohexane.

The starting polyisocyanates mentioned by way of example may be used as such or even in solution in solvents in the first process according to the invention. Suitable solvents are, in particular, the usual lacquer solvents such as butyl acetate, methyl ethyl ketone, methyl isobutyl ketone, ethylene glycol monoethyl ether acetate, toluene, xylene or mixtures of these solvents.

The dyes used in the process according to the invention are those of which the absorption maximum in the visual spectrum is in the range of about 560 to 590 nm, preferably in the range of about 570 to 580 nm, and which are soluble in the polyisocyanates or their solutions, or mixtures of such dyes. Examples of suitable dyes are blue to violet anthraquinone dyes, blue to violet azo dyes, blue to violet symmetrical cyanine dyes or mixtures thereof. Violet anthraquinone dyes and/or mixtures of blue and red anthraquinone dyes are particularly preferred. Specific examples of the dyes in question are 1-hydroxy-4-(4-tolylamino)-anthraquinone, 1,4-diamino-2,3-diphenoxyanthraquinone (Color Index 62025), Makrolexrotviollett R or Makrolexblau RR (1,4-bis-(2,6-diethyl-4-methylphenylamino)-anthraquinone or 1,8-bis-(4-methylphenylamino)-anthraquinone). The expression "organic dyes" as used in the context of the invention is also intended to include organic metal salts which comply with the above-mentioned requirement with regard to the absorption maximum, such as cobalt naphthenate, as these are also suitable for use in accordance with the invention.

The quantity of dye to be added to the starting polyisocyanate depends upon its color and upon the particular type of dye used and generally amounts to between about 0.01 and 1 ppm, preferably between about 0.1 and 0.6 ppm, based on starting polyisocyanate. The optimal quantity is best empirically determined by a few preliminary tests.

The dyes may be added to the starting polyisocyanates or their solutions in solid or dissolved form, in which case the solvents mentioned above or even triethyl phosphate for example may be used.

In the second process for producing the substantially colorless polyisocyanates according to the invention, the dyes are incorporated in the starting diisocyanates or in the auxiliaries used for their modification before the actual production of the modified lacquer-grade polyisocyanates. Thus, it is possible, for example, in the production of biuret polyisocyanates based on 1,6-diisocyanatohexane, to incorporate the dye (mixture) in the 1,6-diisocyanatohexane used or in the particular biuretizing agent used if the dyes are soluble therein. It is also possible, in the production of isocyanurate polyisocyanates, to incorporate the dyes in the particular starting diisocyanates. The quantity in which the dyes are used is measured in such a way that, following the removal of excess monomeric diisocyanates, the dyes are present in the biuret or isocyanurate lacquer-grade polyisocyanates ultimately obtained in a concentration within the limits mentioned above. Once again, it is advisable to carry out a few preliminary tests.

In certain instances, especially if solvents containing ether groups such as, for example, ethylene glycol monoethylester acetate are used to dissolve the polyisocyanates and the organic dye which is essential to the invention it may be advisable to also add a small amount, e.g. of from about 10 to about 1000 ppm (weight) based on the total composition of an antioxidant to the composition such as for example 2,6-di-t-butyl-phenol, 2,6-di-t-butyl-4-methylphenol or 2-(1-hydroxy-2,6-di-t-butyl-phenyl)-propionic acid octadecyl ester. These antioxidants prevent a degradation of the dyes by oxidation.

The invention is illustrated by the following Examples in which all the percentages quoted are percentages by weight, unless otherwise indicated.

EXAMPLES

Example 1

25.5 mg of 1-hydroxy-4-(4-tolylamino)-anthraquinone were dissolved in 100 ml of triethyl phosphate. 1 ml of dye solution was taken from this stock solution and mixed with 57 g of triethyl phosphate and 14.2 g of water. The biuretizing agent to be used was obtained in this way.

In a three-necked flask equipped with a stirrer, dropping funnel and reflux condenser connected by a hose to a gas meter, 1008 g (6 moles) of 1,6-diisocyanatohexane and 80 g of triethyl phosphate were heated under nitrogen with stirring to 120° C. The stream of nitrogen was stopped and addition of the prepared biuretizing agent was commenced at that temperature. The biuretizing agent was introduced dropwise over a period of 3 hours at 120° C. The mixture was then heated to 180° C. and stirred for 30 minutes at that temperature. After cooling, a substantially colorless crude biuret was obtained. The product was then freed twice from monomeric 1,6-diisocyanatohexane and from the solvent at 155° C./0.4 mbar in a thin-layer evaporator. A substantially colorless biuret polyisocyanate containing 0.5 ppm (by weight) of the dye used was obtained. The biuret polyisocyanate had the following characteristics:

Viscosity (25° C.): 3823 mPa.s
NCO-content: 22.4%
Hazen color index (DIN 53 409): 30

Yellow value (DIN 6167): 1.7
Residual 1,6-diisocyanatohexane content: 0.4%

Comparison Example 1

The procedure was as described in Example 1, except that the biuretizing agent was prepared without addition of the dye. In this case, therefore, the biuretizing agent consisted solely of the mixture of 14.2 g of water and 57 g of triethyl phosphate. By proceeding in the same way as described in Example 1, a yellow biuret polyisocyanate mixture was obtained having the following characteristics:

Viscosity (25° C.): 4274 mPa.s
NCO-content: 21.8%
Hazen color index (DIN 53 409): 100
Yellow value (DIN 6167): 4.9
Residual monomeric 1,6-diisocyanatohexane content: 0.4%

Example 2

1 kg of a 75% commercially available solution (xylene:ethyl glycol acetate 1:1) of a biuret polyisocyanate mixture based on 1,6-diisocyanatohexane having a Hazen color index of 260 and a yellow value of 13.0 were mixed with 0.5 mg of 1-hydroxy-4-(4-tolylamino)-anthraquinone. A clear, colorless solution having a Hazen color index of 0 and a yellow value of 0 was obtained in this way.

Example 3

1 kg of a 90% commercially available solution (butyl acetate) of an isocyanurate polyisocyanate mixture based on 1,6-diisocyanatohexane having a Hazen color index of 300 and a yellow value of 15 were mixed with 0.6 mg of 1,4-diamino-2,3-diphenoxyanthraquinone. A clear solution having a Hazen color index of 50 and a yellow value of 2.6 was obtained in this way.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A substantially colorless organic polyisocyanate, optionally in solution in an inert solvent, having a Hazen color index according to DIN 53 409 of at most 60 and a yellow value according to DIN 6167 of at most 3.0, which contains about 0.01 to 1 ppm (by weight), based on polyisocyanate, of an organic dye soluble in the polyisocyanate and having an absorption maximum of about 560 to 590 nm or of a mixture of said dyes.

2. The substantially colorless organic polyisocyanate of claim 1 wherein the polyisocyanate is a lacquer-grade polyisocyanate selected from the group consisting of biuret polyisocyanates based on 1,6-diisocyanatohexane, isocyanurate polyisocyanates based on 1,6-diisocyanatohexane, isocyanurate polyisocyanates based on 1-isocyanato-3,3,5-trimethyl-5-isocyanatomethyl cyclohexane and isocyanurate polyisocyanates based on mixtures of 1,6-diisocyanatohexane and 1-isocyanato-3,3,5-trimethyl-5-isocyanatomethyl cyclohexane.

3. A process for producing a substantially colorless organic polyisocyanate which comprises mixing a polyisocyanate, optionally dissolved in an inert solvent, with about 0.01 to 1 ppm, based on polyisocyanate, of an organic dye soluble in the polyisocyanate and having an absorption maximum of about 560 to 590 nm or of a mixture of said dyes.

4. The process of claim 3 wherein said substantially colorless organic polyisocyanate is a lacquer-grade polyisocyanate selected from the group consisting of biuret polyisocyanates based on 1,6-diisocyanatohexane, isocyanurate polyisocyanates based on 1,6-diisocyanatohexane, isocyanurate polyisocyanates based on 1,6-isocyanato-3,3,5-trimethyl-5-isocyanatomethyl cyclohexane and isocyanurate polyisocyanates based on mixtures of 1,6-diisocyanatohexane and 1-isocyanato-3,3,5-trimethyl-5-isocyanatomethyl cyclohexane.

5. A process for producing a substantially colorless, lacquer-grade polyisocyanate selected from the group consisting of biuret polyisocyanates based on 1,6-diisocyanatohexane, isocyanurate polyisocyanates based on 1,6-diisocyanatohexane, isocyanurate polyisocyanates based on 1-isocyanato-3,3,5-trimethyl-5-isocyanatomethyl cyclohexane and isocyanurate polyisocyanates based on mixtures of 1,6-diisocyanatohexane and 1-isocyanato-3,3,5-trimethyl-5-isocyanatomethyl cyclohexane which comprises biuretizing or trimerizing the corresponding diisocyanate in the presence of about 0.01 to 1 ppm, based on the weight of the lacquer-grade polyisocyanate obtained by the biuretization or trimerization, of an organic dye soluble in the polyisocyanate and having an absorption maximum of about 560 to 590 nm or a mixture of said dyes.

6. A process for the production of polyisocyanate polyaddition products which comprises reacting
(a) the polyisocyanate of claim 1 with
(b) an isocyanate-reactive compound.

7. The process of claim 6 wherein said polyisocyanate polyaddition product is a polyurethane plastic and said isocyanate-reactive compound contains hydroxyl groups.

8. The process of claim 6 wherein said polyisocyanate is blocked with a blocking agent for isocyanate groups.

9. The process of claim 7 wherein said polyisocyanate is blocked with a blocking agent for isocyanate groups.

10. The substantially colorless organic polyisocyanate of claim 1 wherein an inert solvent containing ether groups is present and, in addition, about 10 to about 1000 ppm, based on the total composition, of an antioxidant is also present.

11. The substantially colorless organic polyisocyanate of claim 2 wherein an inert solvent containing ether groups is present and, in addition, about 10 to about 1000 ppm, based on the total composition, of an antioxidant is also present.

* * * * *